United States Patent
Irudayaraj (10) Patent No.: US 7,269,692 B2
(45) Date of Patent: Sep. 11, 2007

(54) IMPLICIT CONNECTION CACHING

(75) Inventor: Rajkumar Irudayaraj, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 437 days.

(21) Appl. No.: 10/446,042

(22) Filed: May 27, 2003

(65) Prior Publication Data

US 2004/0255307 A1    Dec. 16, 2004

(51) Int. Cl.
*G06F 12/00* (2006.01)
(52) U.S. Cl. .................... 711/118; 709/219; 709/229
(58) Field of Classification Search ............... 711/118; 709/219, 229
See application file for complete search history.

(56) References Cited

U.S. PATENT DOCUMENTS

| | | | |
|---|---|---|---|
| 5,852,717 A * | 12/1998 | Bhide et al. ............... 709/203 |
| 5,894,554 A * | 4/1999 | Lowery et al. ............. 709/203 |
| 6,081,900 A | 6/2000 | Subramaniam et al. |
| 6,134,588 A | 10/2000 | Guenthner et al. |
| 6,415,335 B1 * | 7/2002 | Lowery et al. ................ 710/5 |
| 6,446,225 B1 * | 9/2002 | Robsman et al. ............. 714/55 |
| 6,757,733 B2 | 6/2004 | Gupta |
| 2002/0184123 A1 * | 12/2002 | Sijacic et al. ................ 705/34 |
| 2003/0028580 A1 * | 2/2003 | Kucherawy ................ 709/101 |
| 2004/0003175 A1 * | 1/2004 | Maly et al. ................ 711/128 |
| 2004/0153549 A1 | 8/2004 | Naito et al. |

* cited by examiner

Primary Examiner—Matthew Kim
Assistant Examiner—Hetul Patel
(74) Attorney, Agent, or Firm—Aka Chan LLP (57) ABSTRACT

Techniques for implicitly caching connections to a resource (e.g., a database) are provided. A request for a connection does not specify that available connections are stored in a cache. If available connections are stored in a cache, the connection to the resource is obtained from the cache. Otherwise, a new connection to the resource is opened directly, without a connection caching mechanism.

26 Claims, 11 Drawing Sheets

IMPLICIT CONNECTION CACHING

RELATED APPLICATIONS

This application is related to U.S. application Ser. No. 10/445,985, filed May 27, 2003 and U.S. application Ser. No. 10/446,066 filed May 27, 2003 both of which are hereby incorporated by reference.

BACKGROUND OF THE INVENTION

The present invention relates to computer systems. More specifically, the invention relates to providing requests for connections to a resource that implicitly utilize a connection cache.

In computer systems, it is common for an application to obtain a connection to a desired resource. An application programming interface (API) can define the calls that obtain a connection, access the resource, close a connection, and the like. For example, the Java database connectivity (JDBC) is an API that allows Java applications to connect and access databases.

Establishing a connection and closing a connection can take unwanted time and processing capability. Accordingly, it is known to pool connections in a connection cache. When an application wants a connection from the cache, a request for a connection from the cache is sent and fulfilled with a connection from the cache (or a new connection). When that application is finished with the connection, the application closes the connection and the connection is returned to the cache. Thus, if another application (or the same one at a later point in time) requests a connection from the cache, the connection can be readily been given from the cache, if available.

Currently, JDBC driver vendors implement a different datasource (abstractions to the resource) for connection caching. In other words, to access the same resource, one may need to make one API call to get a connection where connection caching is not being used and a different API call to get a connection where connection caching is being used.

Problems with this implementation is that there are more datasources than required, which can become confusing. Additionally, a client needs to know if connection caching is being utilized in order to make the correct API call.

Accordingly, it would be desirable to have innovative techniques of connection caching. Additionally, it would be beneficial to have techniques that allow connection caching to be transparent to the client.

SUMMARY OF THE INVENTION

The present invention provides innovative techniques for implementing connection caching. In general, a client can make use the same request for a connection, whether or not connection caching is being utilized. In this manner, implicit connection caching is achieved as the client need not know that connections to the resource are being cached. This can reduce the number of datasources and simply requests for connections to the resource at the client level. Some specific embodiments of the invention are described below.

In one embodiment, the invention provides a method of caching connections to a resource. A request for a connection to the resource is received, where the request does not indicate whether the connection to the resource should be obtained from the cache or opened to the resource. It is determined if available connections are stored in a cache. If available connections are stored in a cache, the connection to the resource is obtained from the cache. In some embodiments, the cache is initialized if this is the first request for a connection in which available connections are cached.

In another embodiment, the invention provides a method of caching connections to a resource. A request for a connection to the resource is received. A property of the resource is analyzed to determine if available connections are stored in a cache. If available connections are stored in a cache, the connection to the resource is obtained from the cache. Otherwise, if available connections are not stored in a cache, the connection to the resource is obtained by opening the connection.

Other features and advantages of the invention will become readily apparent upon review of the following description and association with the accompanying drawings, where the same or similar structures are designated with the same reference numerals.

DETAILED DESCRIPTION OF PREFERRED EMBODIMENTS

In the description that follows, the present invention will be described in reference to embodiments that set a time-to-live timeout for connections to a database. However, embodiments of the invention are not limited any particular architecture, environment, application, or implementation. For example, although an exemplary three-tiered architecture for a database management system will be described, the invention may be advantageously applied to any database application or architecture. Therefore, the description of the embodiments that follows is for purposes of illustration and not limitation.

Figure 1:
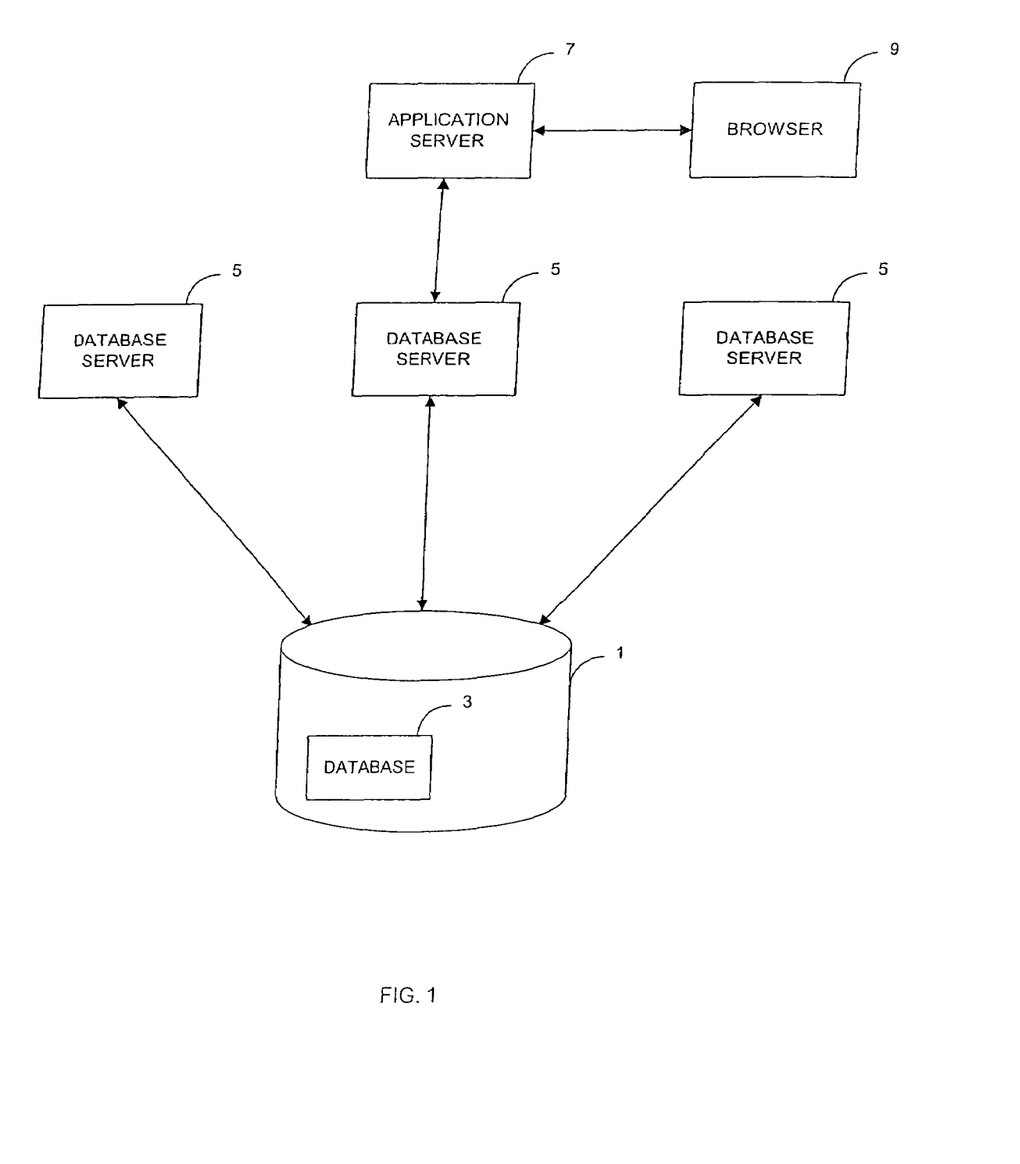
FIG. 1 shows an example of a three-tiered architecture for a database management system.

A fairly common database management system architecture is the three-tiered architecture that is shown in FIG. 1.

At the core of the database management system is a central storage 1 that stores a database 3. Database 3 is typically stored on one or more hard drives, which is typically part of a larger computer system. The information can be stored on database 3 in a variety of formats with relational database management systems relying heavily on tables to store the information.

Database servers 5 are instances of a program that interacts with database 3. Each instance of the database server can, among other things, independently query database 3 and store information therein. Database servers 5 may not include user friendly interfaces to access database 3. Database 3 and database servers 5 comprise the lowest tier of the hierarchy.

One or more application server 7 can provide the user interfaces to database server 5. For example, application server 7 can be a web application server on the Internet (or other network). Application server 7 can accept commands from users for accessing database 3 through database server 5. As an example, application server 7 can be a structured query language (SQL) server. Thus, application server 7 is in the middle tier of the hierarchy.

Although application server 7 can accept user commands, a web browser 9 (or other client application) can be utilized to access application server 7 through a user friendly interface. Web browser 9 is an example of an application in the highest tier in the hierarchy.

Figure 2:
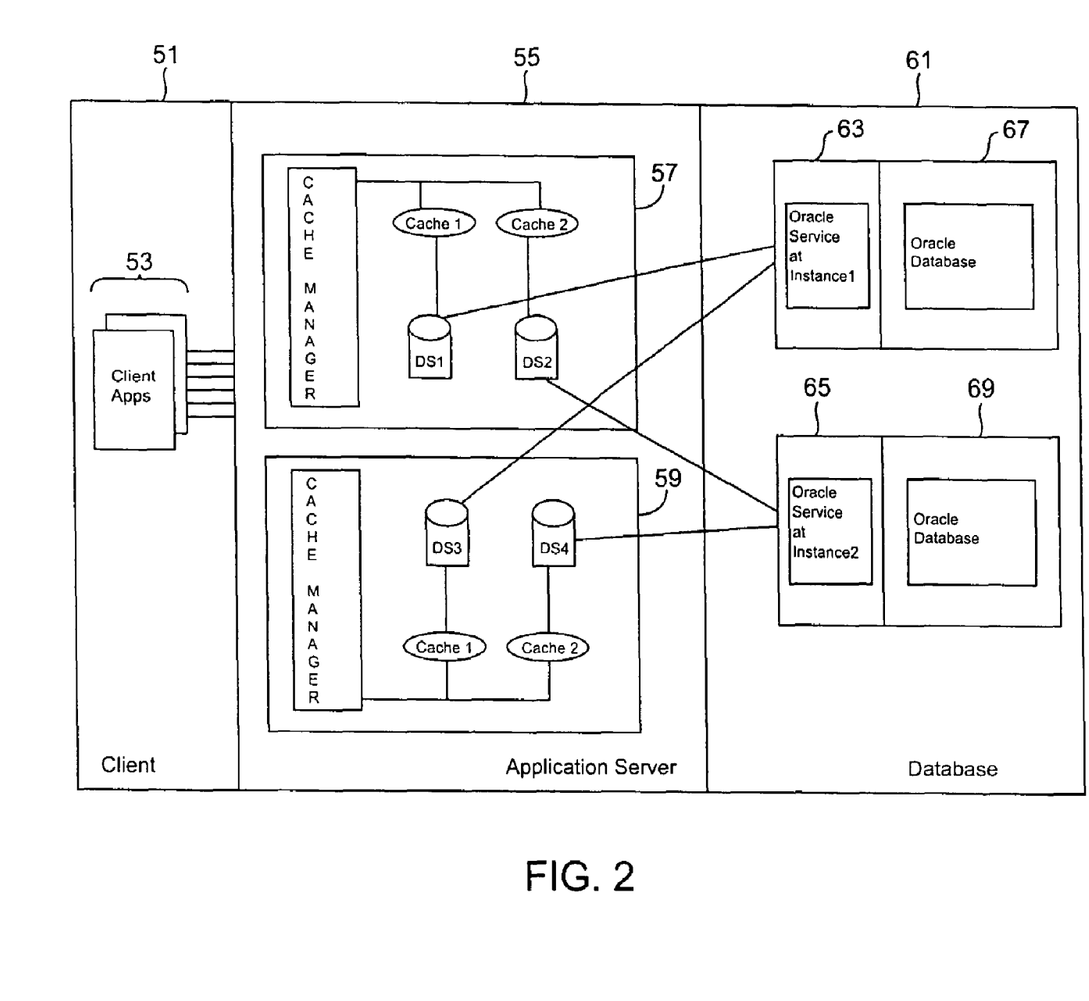
FIG. 2 shows a block diagram of one embodiment that utilizes a JDBC connection cache in the middle tier of a database management system.

FIG. 2 shows an embodiment of a three-tiered database architecture including a cache manager and connection cache. In a tier 51 are shown client applications 51. Within middle tier 55 are two application server nodes 57 and 59. Each node includes a cache manager that manages connection caches and provides cache administration APIs. In the embodiment shown, each cache stores JDBC connections to a datasource (labeled as DS followed by a number). The cache manager can manage one or more connections caches, with one connection cache per datasource.

Tier 61 includes instances of the database server 63 and 65 along with databases 67 and 69 (here an ORACLE database). The datasources from the middle tier refer to instances of the database server as shown.

Figure 3:
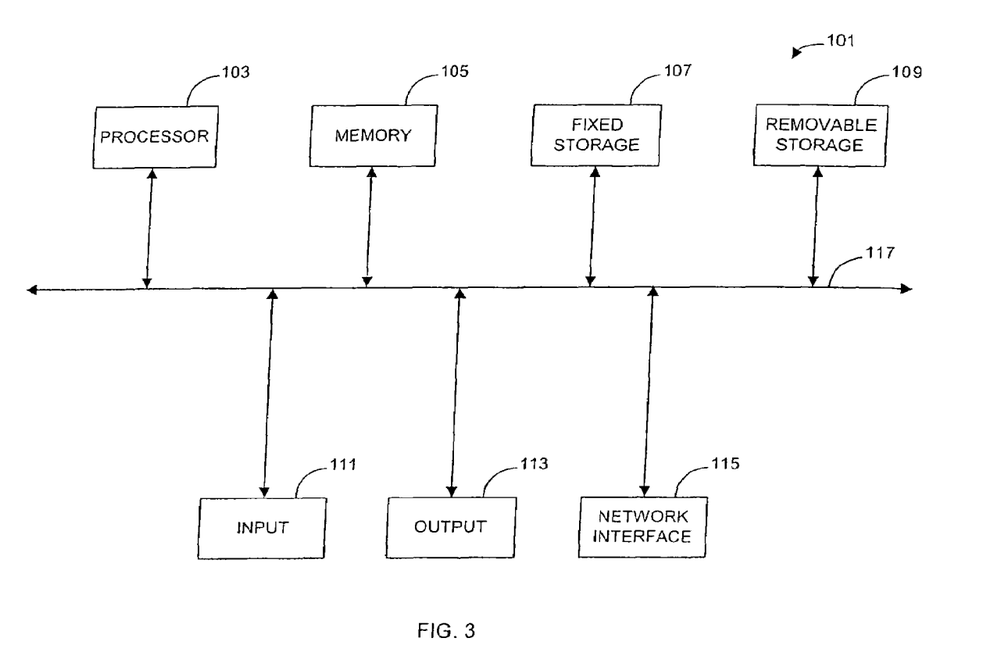
FIG. 3 illustrates a block diagram of a computer system that can be utilized in association with embodiments of the invention.

FIG. 3 shows a block diagram of components that can be present in computer systems that implement embodiments of the invention. A computer system 101 includes a processor 103 that executes instructions from computer programs (including operating systems). Although processors typically have memory caches also, processor 103 utilizes memory 105, which can store instructions or computer code and data.

A fixed storage 107 can store computer programs and data such that it is typically persistent and provides more storage when compared to memory 105. At present, a common fixed storage for databases is multiple (e.g., arrays) hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of computer readable storage media that can be utilized to store and retrieve computer programs incorporating computer codes that implement the invention, data for use with the invention, and the like. An input 111 allows a user to interface with the system. Input can be done through the use of a keyboard, a mouse, buttons, dials, or any other input mechanism. An output 113 allows the system to provide output to the user. Output can be provided through a monitor, display screen, LEDs, printer or any other output mechanism.

A network interface 115 allows the system to interface with a network to which it is connected. The system bus architecture of computer system 101 is represented by arrows 117. The components shown in FIG. 3 can be found in many computer systems. However, components can be added, deleted and combined. For example, fixed storage 107 could be a file server that is accessed through a network connection. Thus, FIG. 3 is for illustration purposes and not limitation.

Now that exemplary database applications and environments have been described, it may be beneficial to discuss embodiments of the invention. Although specific embodiments are described, features can be added and combined without departing from the spirit and scope of the invention. For example, features from more than one of the embodiments can be advantageously implemented in other embodiments.

Time-to-Live Timeout

When connections are given from the connection cache, a specific time-slice is attached to it. For example, the connection can have a time-to-live timeout that specifies the amount of time that the connection can be utilized by the client. This can be beneficial, among other reasons, for clients that obtain a connection, use it and then do not close the connection even though they are performing actions that do not utilize the connection.

Figure 4:
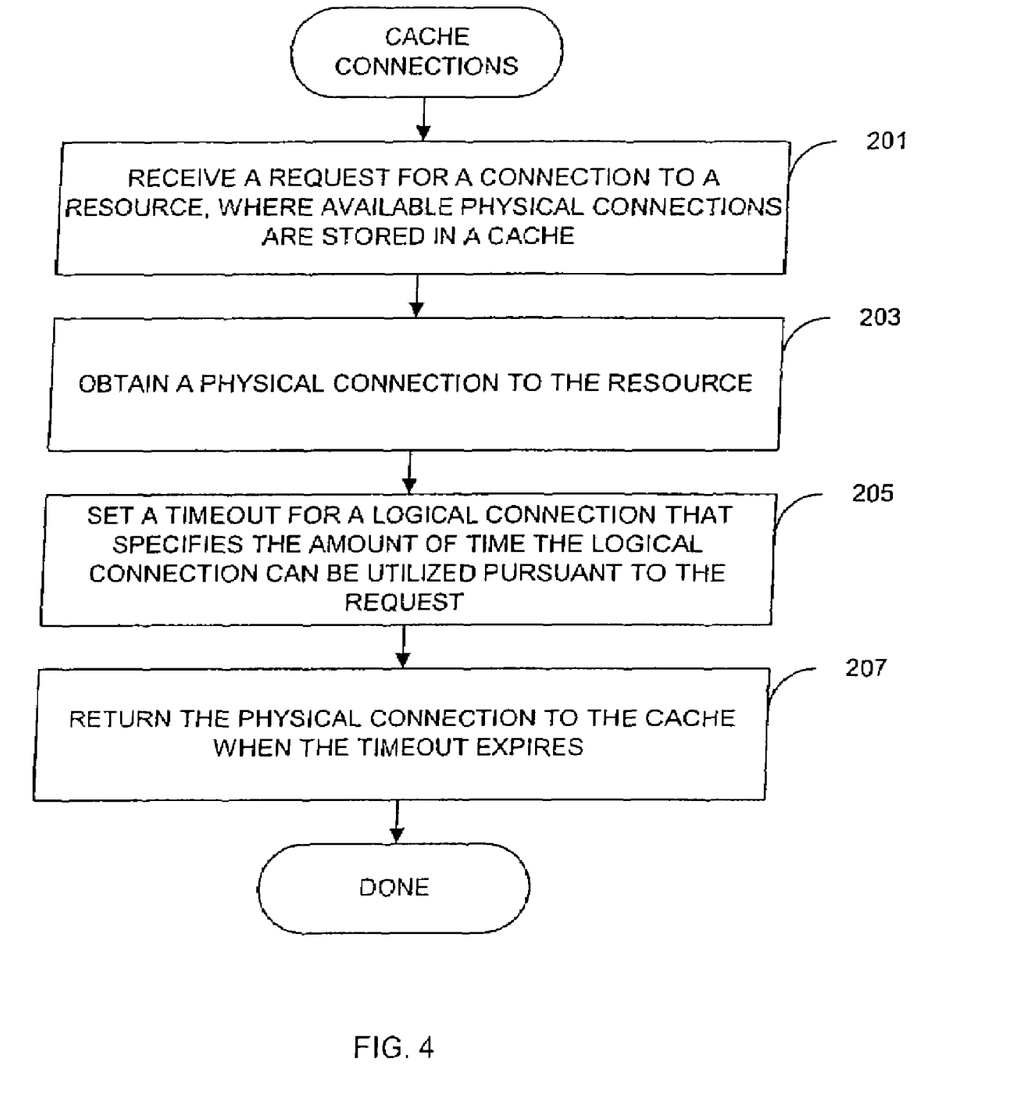
FIG. 4 shows a flowchart of a process of caching connections utilizing a timeout for the amount of time a connection can be utilized.

FIG. 4 shows a flowchart of a process that utilizes a timeout for the amount of time a connection can be utilized. As with all the flowcharts shown herein, steps can be added, deleted, reordered, or combined without departing from the spirit and scope of the invention.

At a step 201, a request for a connection to a resource is received where available physical connections are stored in a cache. The resource can be a database or any other type of resource. A physical connection to the resource is obtained at a step 203. For example, a client can use a logical connection, which utilizes the physical connection, to access a desired database.

At a step 205, a timeout for a logical connection that utilizes the physical connection is set that specifies the amount of time the logical connection can be utilized pursuant to the request. The physical connection is returned to the cache at a step 207 if the timeout expires. In this manner, there is a time limit on how long a connection can be utilized. Now that a high level flow has been described, it may be beneficial to describe more details of one embodiment.

In one embodiment, a cache manager manages a connection cache for JDBC connections. A cache manager and cache can be initialized explicitly or upon the first request for a connection where connection caching in enabled (see later section on Implicit Connection Caching).

A single cache manager can be utilized to manage all caches for a virtual machine (VM). The cache manager is responsible for creating the cache, maintaining the cache and removing it from existence. The cache manager binds a connection cache to a datasource.

Conceptually, it can be beneficial to think of two different types of connections: logical and physical. Physical connections are connections to a datasource and are stored in the cache (or given to a client application upon request). Logical connections are the connection handles that client applications obtain to a resource that utilize an underlying physical connection. In this manner, a logical connection can be closed (for any number of reasons including the expiration of a time-to-live timeout), but the underlying physical connection remain open (e.g., and returned or placed in the cache).

When a connection cache is created, connection cache properties can define characteristics of the cache. The following are some exemplary properties that can be utilized for the connection cache.

TimeToLiveTimeout—sets the maximum time slice, in seconds, a logical connection is given. When this timeout expires, the logical connection can be unconditionally closed, the relevant statement handles canceled and the underlying physical connection returned to the cache for reuse. The default value can be 0, meaning this feature is not enabled.

MinLimit—sets the minimum number of connections the cache maintains. The cache will not shrink below this minimum limit. This property does not initialize the cache with minimum number of connections (see InitialLimit property for priming of cache information). The default value can be 0.

MaxLimit—sets the maximum number of connections the cache can hold. The default value can be unbounded, meaning that there is no MaxLimit assumed. Since the connection cache does not assume the maximum limit, the connection cache is only limited by the number of database sessions configured for the database. In other words, connections in the cache could reach as much as the database allows.

InitialLimit—sets the size of the connection cache when the cache is initially created or reinitialized. When this property is set to a value greater than 0, that many connections are pre-created and are ready for use. This property is typically used to reduce the "ramp up" time in priming the cache to its optimal size. The default can be set to 0.

MaxStatementsLimit—sets the maximum statements to keep open for a connection cache. If the cache is reinitialized with this property and if more cursors are cached than specified, the extra cursors are closed. The default can be 0.

InactivityTimeout—sets the maximum time a connection can remain idle in a connection cache. An idle connection is one that is not active and does not have a logical handle associated with it. When this timeout expires, the physical connection can be closed. However, the size of the cache is not allowed to shrink below the MinLimit set. The default value can be 0, meaning this feature is not in effect.

AbandonedConnectionTimeout—similar to the inactivityTimeout, but on a logical connection. When set, JDBC monitors SQL database activity on this logical connection (connection borrowed from the cache by an application). For example, when a stmt.execute( ) is invoked on this connection, a "heart beat" is registered to convey that this connection is active. The heart beats are monitored only at places (to lower the cost of monitoring) that result in database execute calls. If a connection has been inactive for the specified amount of time, the underlying physical connection is reclaimed and returned to the cache for reuse. The default value can be 0, meaning this feature is not in effect.

PropertyCheckInterval—sets and governs the time interval to wake up and enforce the relevant cache properties. When set, the connection cache manager ensures that the relevant cache properties are enforced periodically as specified. This can be defaulted to 15 minutes.

ValidateConnection—when set to true, causes every connection retrieved from the connection cache to be validated against the underlying database. By default, this can be set to false.

ConnectionWaitTimeout—when specified with a value greater than 0 and specified in seconds, is used when the connection cache has reached MaxLimit. The connection request waits for the specified period of time or until a connection is returned for reuse to the connection cache. If the connection request cannot be serviced (e.g., none match if attributes are being used as described below), then a null may be returned.

Figure 5:
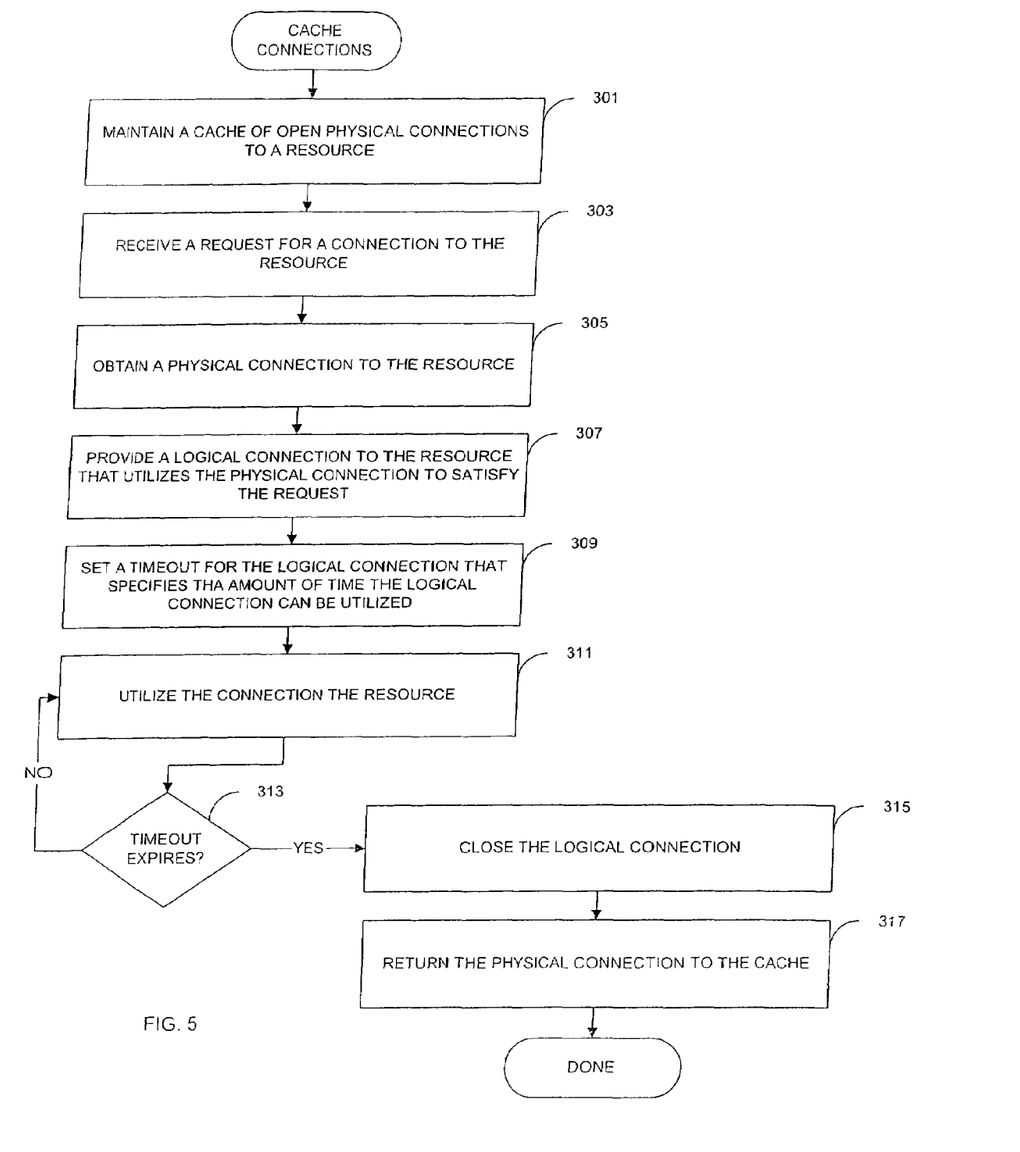
FIG. 5 shows a flowchart of another process of caching connections utilizing a timeout for the amount of time a connection can be utilized.

The preceding described some exemplary properties that can be set for connection cache manager to utilize in initializing and maintaining connection caches. FIG. 5 shows a flowchart of another process of utilizing a timeout for the amount of time a connection can be utilized.

At a step 301, a cache of open physical connections is maintained. A cache manager can be explicitly set up that initializes a connection cache or one can be implicitly set up upon the first request for a connection. As described above, properties can be set in order to dictate how the cache is initialized and maintained by the cache manager.

A request for a connection to the resource is received at a step 303. Typically, the cache manager receives the request from, for example, a client application.

In one embodiment, a request for a connection can be an API called getConnection( ) in which first an attempt is made to retrieve a connection from the cache by matching the datasource properties user/password. If a match is found, then the connection is returned. If a match is not found, then a new connection may be created and returned to the caller.

Alternatively, an API called getConnection(user, password) is invoked where an attempt is made to retrieve a connection from the cache by matching the user/password as set on this connection request. If a match is found the connection is returned. If not, a new connection can be created and returned. When a connection request specifies the user/password, the default user/password on the datasource is ignored.

At a step 305, a physical connection to the resource is obtained. The physical connection can be obtained from the cache or a new physical connection can be obtained (e.g., if no physical connections are in the cache that would satisfy the request). More details of obtaining a physical connection in relation to FIG. 6.

At a step 307, a logical connection to the resource that utilizes the physical connection is provided, thereby satisfying the request. The client or requester does not necessarily know that the connection was obtained from a connection cache.

A timeout for the logical connection is set at a step 309 that specifies the amount of time the logical connection can be utilized. For example, the duration of the timeout (and its use) can be set utilizing the connection cache property TimeToLiveTimeout described above. The timeout can be set to a specified number of seconds, which both enables the timeout and sets the duration. The duration of the timeout can be set in seconds or any other time measurement.

At a step 313, the connection is utilized. If the timeout expires at a step 313, the logical connection is closed at a step 315. Otherwise, the connection can still be utilized.

The physical connection is returned to the cache at a step 317. Once returned to the cache, the physical connection can then be utilized to satisfy other requests to access the resource without requiring obtaining a new physical connection to the database for each request. Additionally, a connection cache property InactivityTimeout can be utilized as described above to limit the amount of time a physical connection stays in the cache unused.

Figure 6:
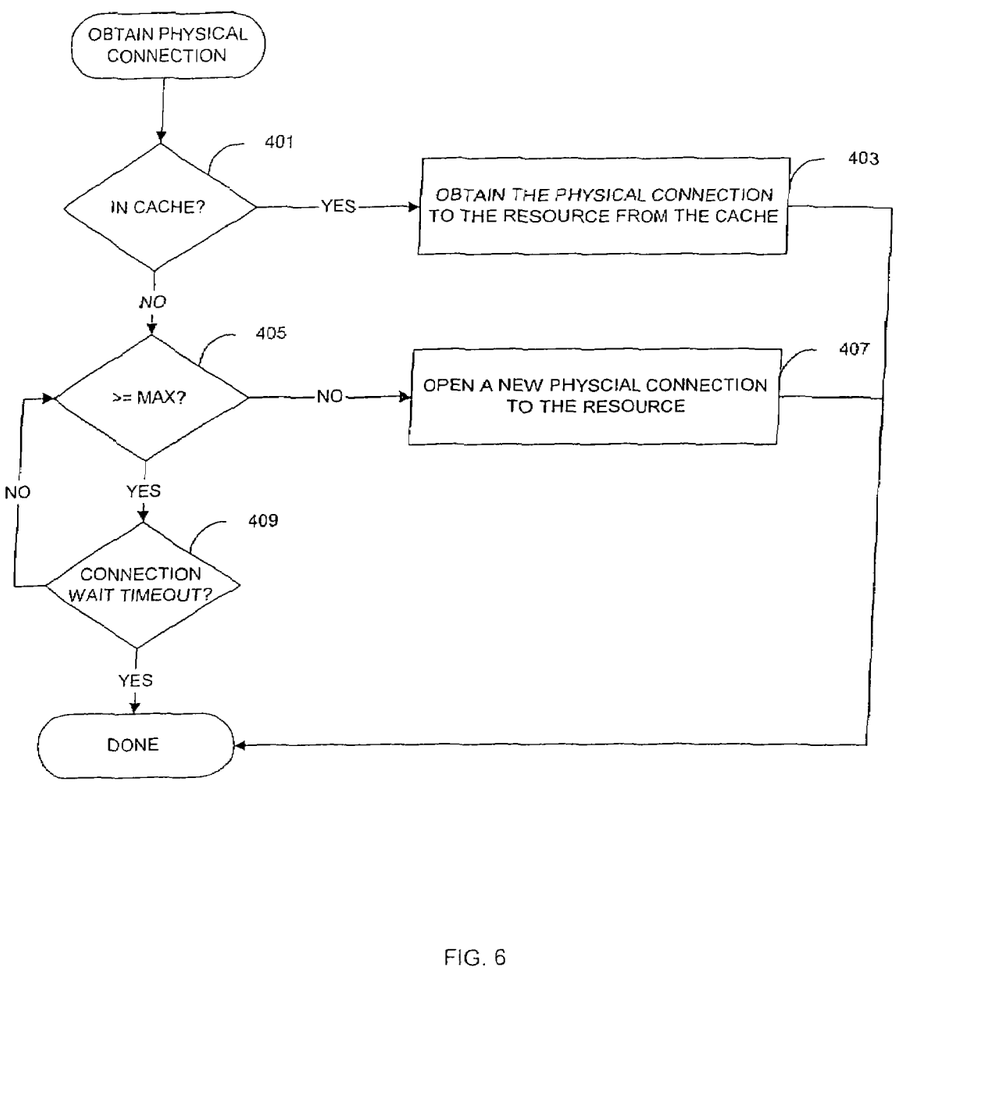
FIG. 6 shows a flowchart of a process of obtaining a physical connection to a resource.

FIG. 6 shows a flowchart of a process to obtain a physical connection. At a step 401, it is determined if there is a physical connection that satisfies the request in the cache. Some embodiments utilize attributes (see later section on Connection Retrieval Utilizing Attribute Weights) so not every physical connection in the cache may satisfy every request.

If there is a physical connection in the cache that satisfies the request, the physical connection to the resource is obtained from the cache at a step 403. Otherwise, a new connection may be needed to be obtained to satisfy the request.

It is determined at a step 405 if the number of physical connections the cache holds is greater than or equal to a maximum number. This can be set by a connection cache property MaxLimit as described above. If the number of physical connections in the cache is less than the maximum number, a new physical connection is opened to the resource at a step 407. The new physical connection can be opened with certain attributes specified in the request in some embodiments.

If, at step 405, the number of physical connections the cache holds is greater than or equal to a maximum number, it can be determined if a connection wait timeout has expired for obtaining the physical connection at a step 409. For example, the connection cache property ConnectionWaitTimeout can be utilized to set the amount of the that will be waited to obtain a physical connection. If the number of physical connections in the cache becomes less than the maximum number before the timeout expires, a new physical connection can be opened at step 407. Otherwise, a return value can indicate that the request for a connection failed.

Additionally, if during the wait at step 409, a physical connection is returned to the cache that satisfies the request, that physical connection can be utilized and a new physical connection need not be opened. Thus, there are other ways a physical connection can be obtained.

By utilizing a time-to-live timeout specifying the amount of time a connection to a resource can be utilized, the utilization efficiency of the connections can be substantially improved. Clients need not be modified to achieve this efficiency that results in clients that are utilizing the connections are the ones that have the connections over time.

Connection Retrieval Utilizing Attribute Weights

Connections to resources can be opened and configured with different attributes that specify qualities of the connection. For example, an attribute (or attribute name) may have the language set (e.g., NLS_LANG) of the connection and an attribute value may specify the language set (e.g., ISO-LATIN-1). If a request for a connection specifies attribute values that are desired, the connection cache attempts to satisfy the request with a matching connection from the cache. This allows requests and connections with specific attribute values to be more efficiently managed.

In some embodiments, clients can call APIs to apply attributes to a connection (the client utilizes that logical connection or handle and the attributes are applied to the underlying physical connection). For example, an API could be called at any time to apply attributes to a connection. When the connection is closed, the physical connection that is returned to the cache would be known by the cache to have those attributes. Accordingly, the cache can utilize that physical connection to satisfy a request that specifies attributes that that match. Alternatively or additionally, an API can be provided that allows a client to close a connection specifying as parameters attributes to be applied to the connection.

Figure 7:
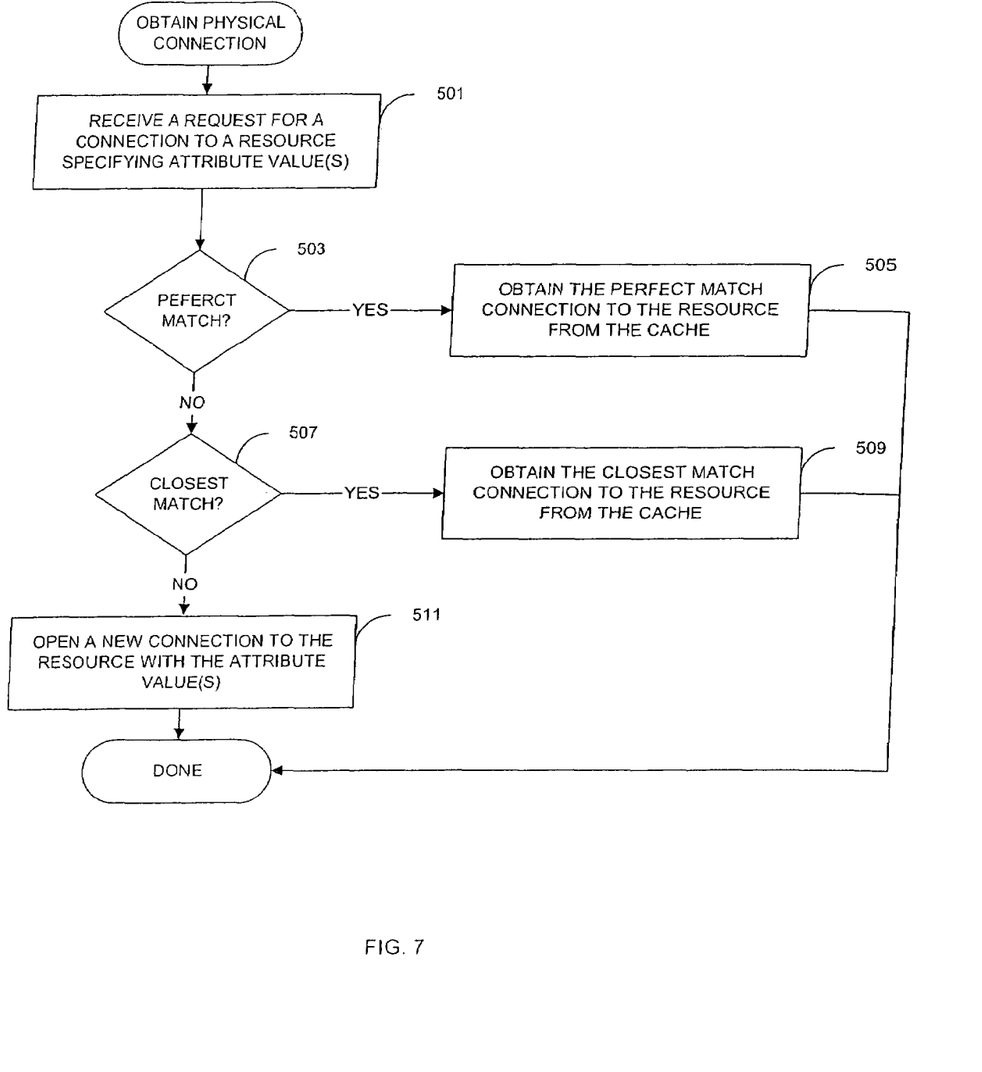
FIG. 7 shows a flowchart of a process of caching connections where a connection can have associated attribute values such that a perfect or closest match can be utilized to satisfy a request for a connection.

FIG. 7 shows a flowchart of a process of caching connections where the connection request specifies attribute values. At a step 501, a request for a connection to a resource is received that specifies one or more attribute values, where available connections are stored in cache. In some embodiments, attribute values are specified in the request as attribute name and value pairs.

It is determined at a step 503 if there is a connection in the cache that has a perfect match of attribute values with the request. If a perfect match exists, the perfect match connection to the resource is obtained from the cache to satisfy the request.

If there is not a perfect match, it is determined if there is a connection in the cache that has a closest match to the attribute values in the request at a step 507. The closest match can be determined many different ways including the number of attribute values that match. In some embodiments, the attribute values have associated weights that are utilized to determine the closest match (e.g., by weighting the attribute values of the connection that match the one or more attribute values specified in the request). Details on one embodiment that utilizes weights for attribute values will be discussed in more detail in relation to FIG. 8.

If there is a closest match, the closest match connection to the resource is obtained from the cache at a step 509. As determining a closest match can be computationally intensive or otherwise undesirable, some embodiments utilize a connection cache property ClosestConnectionMatch to specify if a closest match should be attempted to be found if the perfect match does not exist. By default, this property can be false. If a closest match is not found, a new connection to the resource can be opened without attribute values. Thus, the user can apply attributes to the connection.

In one embodiment, a request for a connection that specifies attribute values can be an API called getConnection (connectionAttributes) where connectionAttributes are attribute name/value pairs specified as java.util.Properties on the getConnection( ) request. These connectionAttributes are opaque to the JDBC connection caching mechanism. In other words, these attributes are used only for connection matching purposes by the connection caching mechanism and there are no assumptions made on the name/value pairs of attributes supplied.

Alternatively, an API called getconnection(user, password, connectionAttributes) can be utilized that is very similar to the one described above, except that the method signature takes user, password and connectionAttributes as arguments. This can be particularly useful to authenticate getConnection( ) requests with the supplied user name, as opposed to the default user on the datasource. If null values are passed for user and password, the datasource defaults can be used.

When a cache manager is creating a connection cache, connection cache properties may be set for the datasource. Thus, the cache manager initially opens connections for the cache with the specified connection cache properties. Otherwise, default connection cache properties can be utilized for the connections.

There is a computational expense for the various attributes, meaning that some attributes are more expensive than others. In general, each attribute can be assigned a weight that approximates the computational expense of establishing a connection with the attribute. For example, in some embodiments, the following connection cache property can be utilized to define weights for connection attributes.

AttributeWeights—attribute name/value pairs that set the weights for each connectionAttribute that the user intends to specify in a request for a connection. Weights can be set for attribute names as integer values greater than zero. For example, the attribute name NLS_LANG could be assigned a weight of 10. When a connectionAttribute based connection request is made on the cache, a perfect or closest match connection is returned, if possible. These weights can be utilized to determine a closest match.

Figure 8:
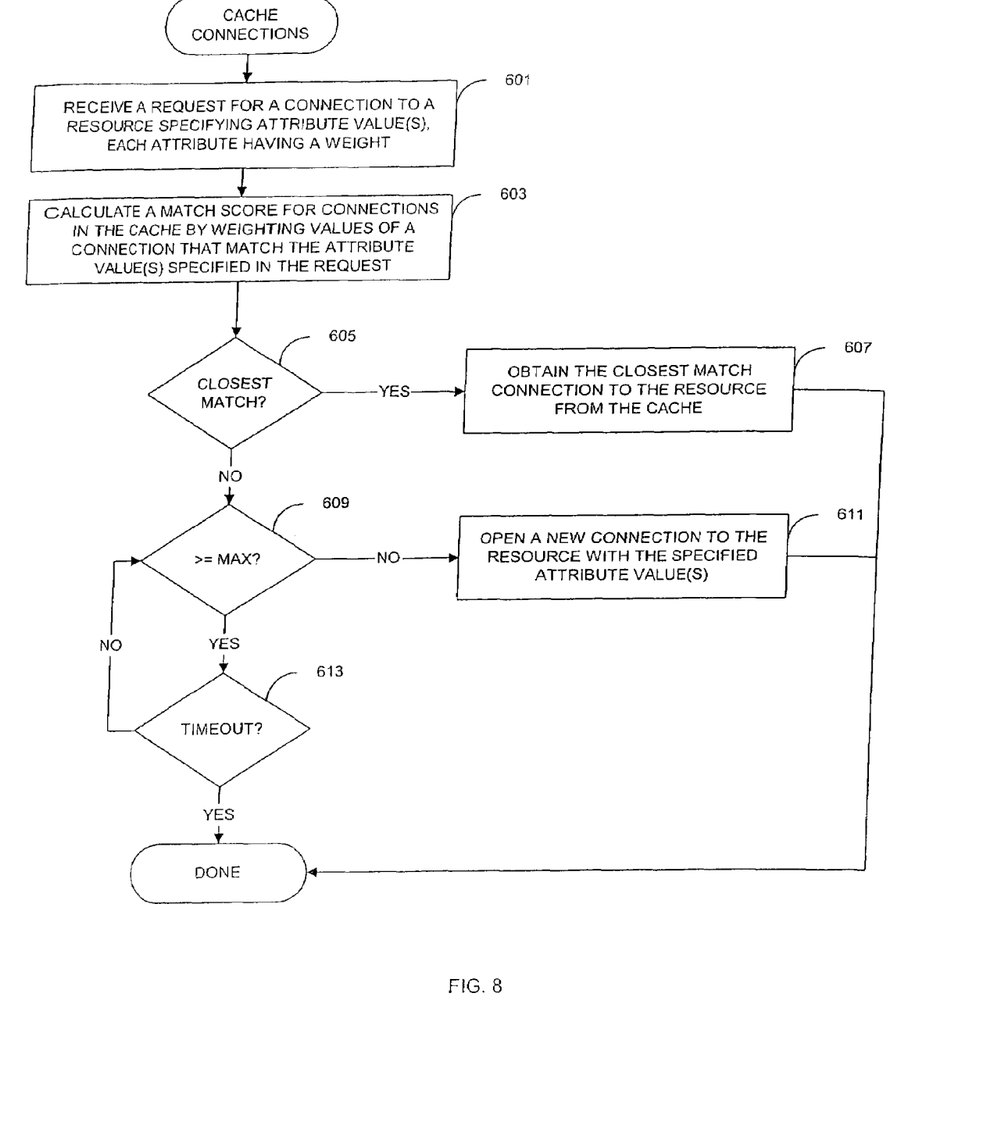
FIG. 8 shows a flowchart of a process of caching connections that determines a closest match by weighting the attribute values of a connection.

FIG. 8 shows a flowchart of a process of caching connections to a resource where attribute weights are utilized to find closest match to a request for a connection. At a step 601, a request for a connection to a resource specifying one or more attribute values is received. Each attribute has an associated weight. In some embodiments, the request specifies attribute name and value pairs, but only the attribute value need be specified if the attribute name can be determined.

A perfect match connection can be then searched for as described in FIG. 8. Alternatively, a closest match can be calculated, which should identify a perfect match as well. However, it may be beneficial to search for a perfect match connection as the computation of a perfect match can be relatively simple. In some embodiments, an attribute value of a connection that does not match an attribute value in a request prevents the connection from being considered a perfect or closest match.

At a step 603, a match score for connections in the cache are calculated by weighting the attribute values of a connection that match the one or more attribute values specified in the request. For example, assume the weights for attributes specified in the connection cache property AttributeWeights is NLS_LANG=10 and ROLE=5.

If the connection request specified attribute values for both these attributes and there was one connection that had a match for NLS_LANG and one had a match for ROLE, then the connection with the NLS_LANG match would be chosen because the weight is higher. The connection with the highest weights (e.g., a sum of weights if more than one match) of matching attributes is chosen because the weights indicate that it is computationally more expensive to match these attributes. Other embodiments could use lower weights to indicate the best match or other criteria for weighting attributes.

At a step 605, it is determined if a closest match connection is found. If so, the closest match connection to the resource is obtained from the cache at a step 607.

Otherwise, it is determined at a step 609 if the number of physical connections the cache holds is greater than or equal to a maximum number (e.g., connection cache property MaxLimit as described above). If the number of physical connections in the cache is less than the maximum number, a new physical connection is opened to the resource with the one or more specified attribute values at a step 611.

If the number of physical connections the cache holds is greater than or equal to a maximum number, it can be determined if a timeout (e.g., connection cache property ConnectionWaitTimeout described above) has expired for obtaining the physical connection at a step 613. If the number of physical connections in the cache becomes less than the maximum number before the timeout expires, a new physical connection can be opened at step 611. Otherwise, a return value can indicate that the request for a connection failed.

Figure 9:
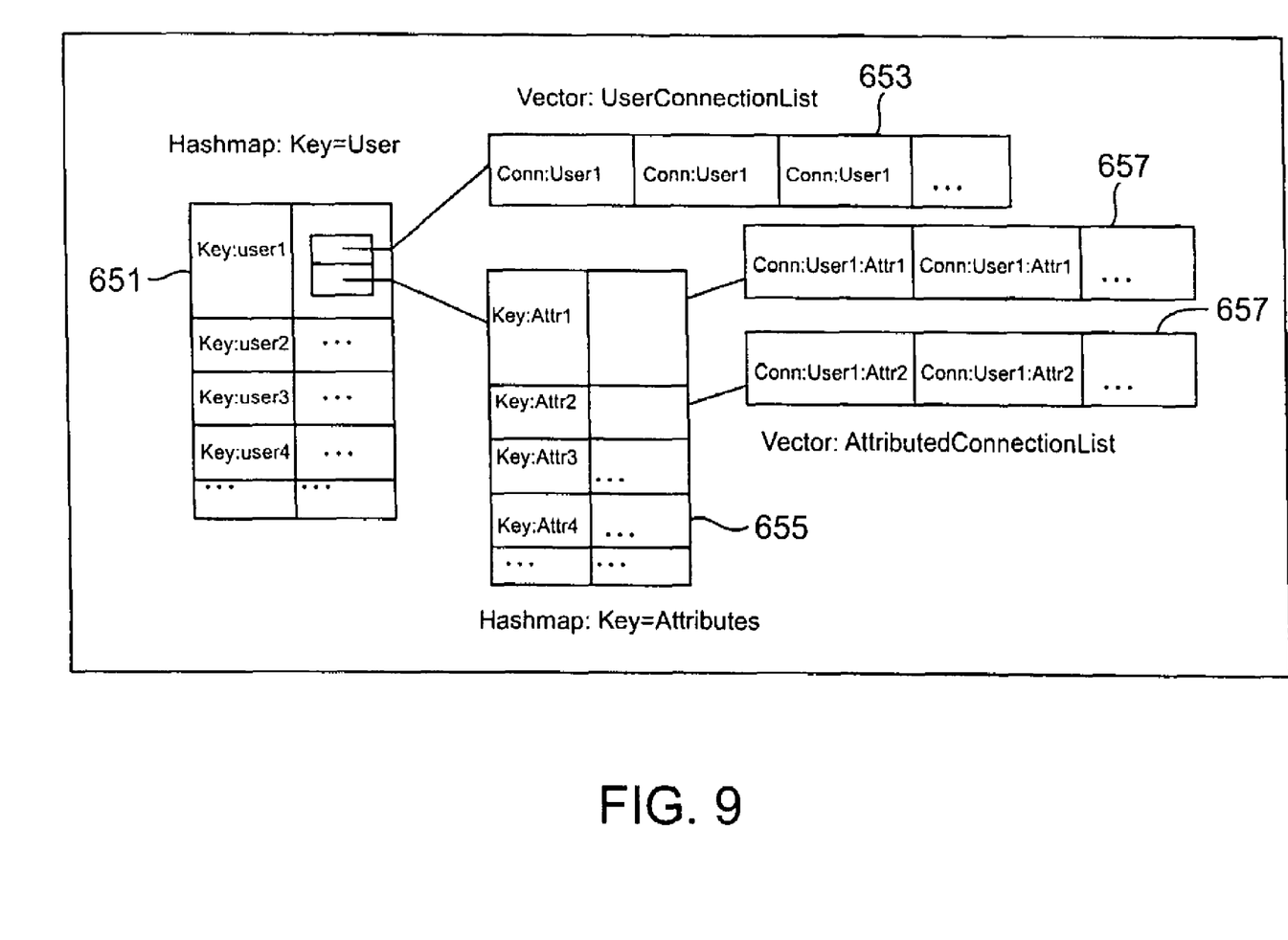
FIG. 9 illustrates an embodiment of a connection cache that utilizes hashmaps and vectors.

In order to facilitate calculating a closest match score for a connection, hashmaps and vectors can be utilized. FIG. 9 illustrates an example of hashmaps and vectors that can be utilized to calculate a closest match score.

Each connection in the connection cache is authenticated as a specific user. Hence, all the physical connection objects are stored based on the user to which they are authenticated. A hashmap 651 contains user name as the key. Each entry in hashmap 651 is an object that includes a vector 653 that specifies authenticated physical connections for the same user and a hashmap 655 that includes connection attributes as keys. Each entry in hashmap 655 refers to a vector 657 that stores all connections that have the connection attributes applied to them. Although some embodiments utilize hashmaps and vectors as data structures to aid in calculating a closest match connection, other data structures can be utilized in other embodiments.

By allowing a connection request to specify attribute values, the efficiency and control of utilizing connections in the cache with attributes (stateful) and without attributes (stateless) is enhanced. Weighting the attributes also allows the determination of a closest match connection to return a connection that takes into account the relative expense of the attributes.

Implicit Connection Caching

In conventional systems, a separate API may be provided for requesting a connection to a resource from a connection cache. This requires that the client application know whether connection caching is being utilized. However, a single connection request that does not specify whether or not a connection from a cache is requested can be utilized as follows.

Figure 10:
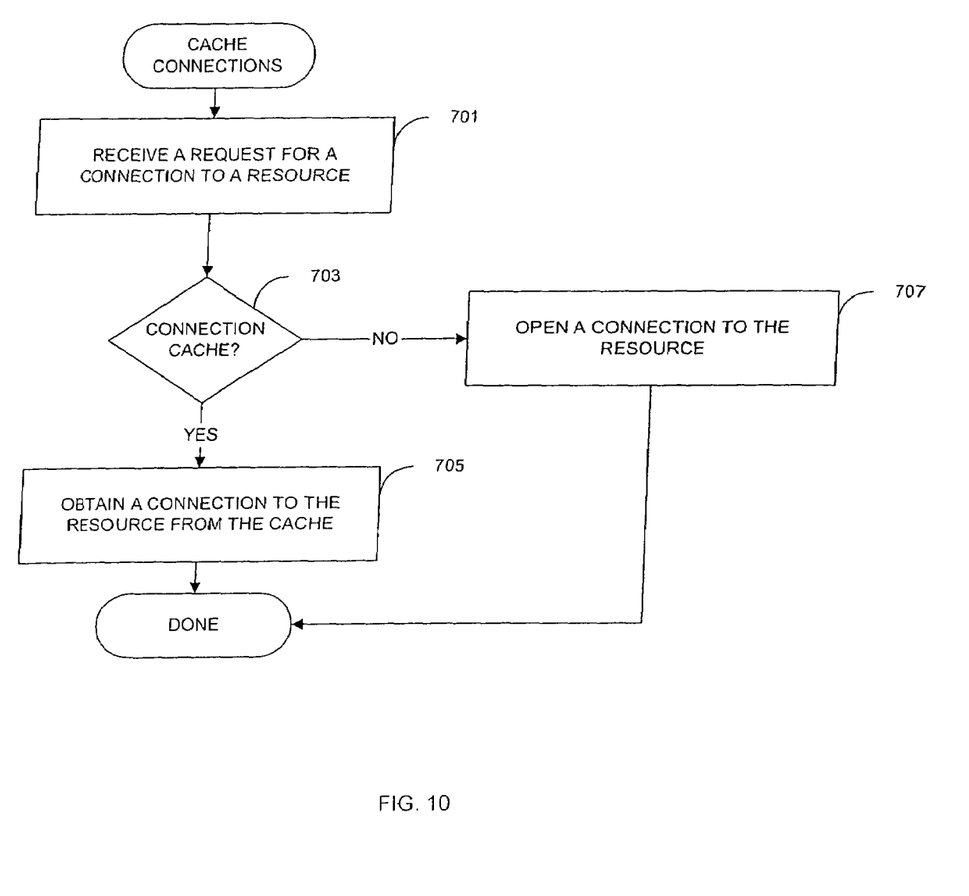
FIG. 10 shows a flowchart of a process of implicitly caching connections where a request for a connection need not explicitly request a connection from a cache.

FIG. 10 shows a flowchart of a process of implicitly caching connections where a request for a connection does not explicitly request a connection from a cache. At a step 701, a request for a connection to a resource is received. In general, the connection request does not specify that connections are stored in a cache so the request does not indicate whether the connection to the resource should be obtained from the cache or opened to the resource. For example, the connection request can be the GetConnection( ) API described above.

At a step 703, it is determined if available connections are stored in a cache. If yes, a connection is obtained from the cache at a step 705. Otherwise, connections are not stored in a cache so a connection to the cache is opened at step 707. In other words, the connection request does not indicate whether connection caching is being utilized, thus connection caching is transparent to the client.

In some embodiments, a datasource property ConnectionCachingEnabled can be utilized to indicate that connection caching is being utilized. If this property it set to true, connections are stored in a cache and the cache will be used implicitly.

Figure 11:
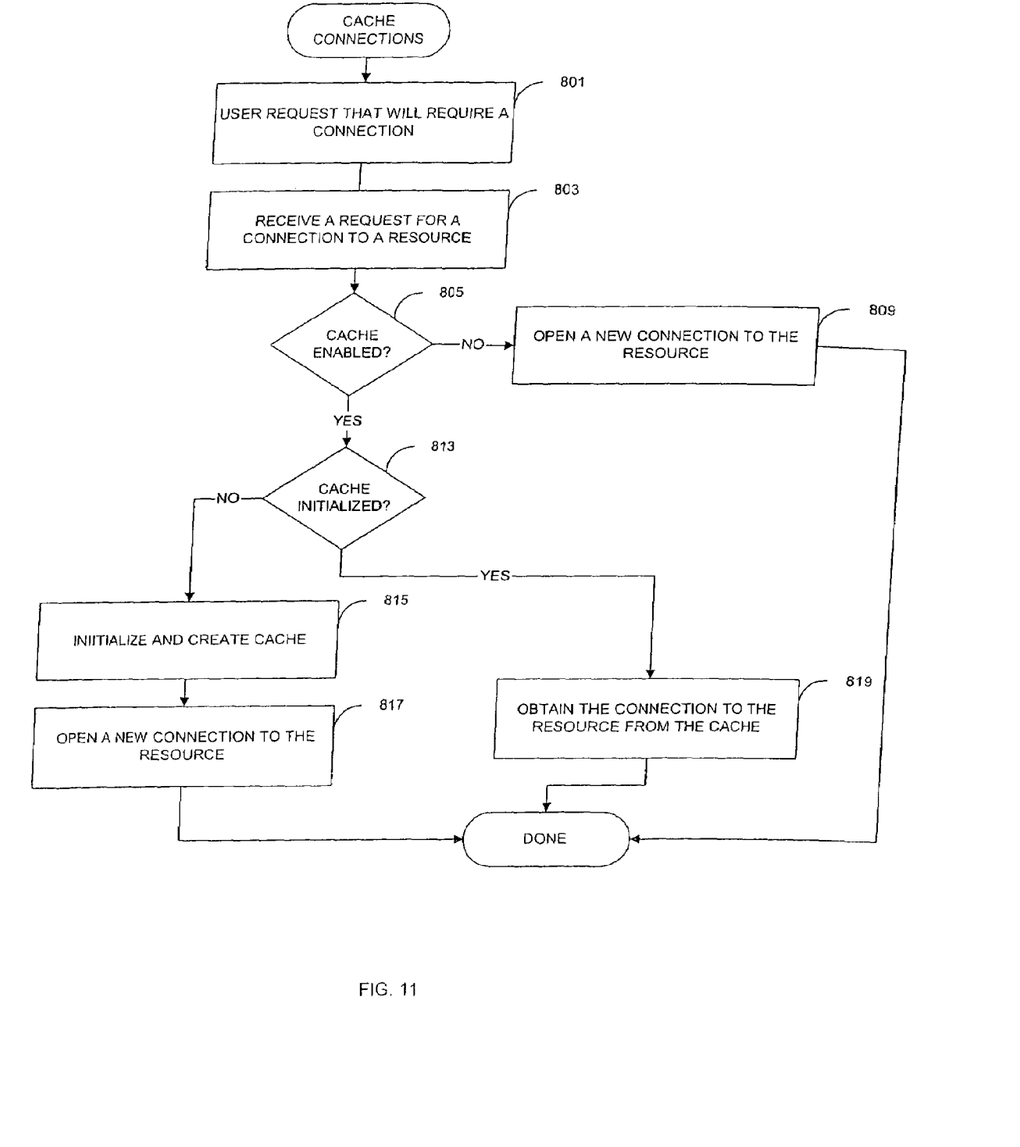
FIG. 11 shows a flowchart of a process of implicitly caching connections by analyzing a property of the resource.

FIG. 11 shows a flowchart of a process of implicitly caching connections by analyzing a property of the resource. At a step 801, a user makes a request that will require a connection to the resource. For example, if the resource is a database, there are requests that do not require a connection to the database and those that do. A request for a connection to a resource is received at a step 803. As discussed above, the connection request does not explicitly state that connection caching is being utilized and it may or may not be being utilized.

At a step 805, it is determined if a cache is enabled to store connections to the resource. In some embodiments, a property of the resource is analyzed to determine if available connections are stored in a cache. For example, it can be determined if ConnectionCachingEnabled is true.

If it is determined that connection caching is not enabled at a step 805, a new physical connection is opened to the resource at a step 809. Otherwise, if connection caching is enabled, it can be determined at a step 813 if the cache is initialized to this resource (or datasource). If the cache is not initialized, the cache is initialized and created at a step 815. In other embodiments, a connection cache is initialized prior to receiving connection requests but the embodiment shown allows the connection cache to be initialized upon the first request for a connection.

At a step 817, a new connection to the resource is opened. The connection can be opened to satisfy the request and the connection is known to the cache. Additionally, a connection cache property InitialLimit as described above can be utilized to specify the number of connections to open upon initialization.

If at step 813, the cache is initialized, the connection to the resource is obtained from the cache at a step 819. FIG. 6 shows more details on one embodiment of a process of obtaining a connection from a cache.

By allowing a connection request to implicitly request a connection from a cached, connection caching is transparent to the clients. Additionally, the complexity of requesting connections is simplified.

While the above is a complete description of preferred embodiments of the invention, various alternatives, modifications, and equivalents can be used. It should be evident that the invention is equally applicable by making appropriate modifications to the embodiments described above. For example, although properties of specific embodiments have been described, embodiments of the invention are not limited to these properties. Therefore, the above description should not be taken as limiting the scope of the invention that is defined by the metes and bounds of the appended claims along with their full scope of equivalents.

What is claimed is:

1. A method of caching connections to a resource, comprising:
    receiving a request for a connection to the resource, wherein the request is arranged to specify a plurality of attribute values and the request does not indicate whether the connection to the resource should be obtained from a cache or opened to the resource;
    determining if available connections are stored in a cache, comprising determining if a first connection in the cache has a first attribute value that matches a second attribute value of the plurality of attribute values and if the first connection in the cache has a third attribute value that matches a fourth attribute value of the plurality of attribute values; and
    obtaining the connection to the resource from the cache if available connections are stored in a cache.

2. The method of claim 1, wherein determining if available connections are stored in a cache comprises analyzing a property of the resource.

3. The method of claim 1, further comprising initializing the cache if available connections are stored in a cache and the request is a first request for a connection to the resource.

4. The method of claim 1, wherein the resource is a database.

5. The method of claim 1 wherein determining if available connections are stored in a cache comprises weighting the attribute values.

6. The method of claim 5 wherein the attribute values include language sets of available connections stored in the cache.

7. The method of claim 1 further including:
    utilizing the connection to the resource;
    determining when a timeout associated with the connection to the resource expires, wherein the time out specifies a time limit on how long the connection to the resource may be utilized; and
    returning the connection to the resource to the cache when the timeout expires.

8. A computer-executable program product embodied using a computer-readable medium that caches connections to a resource, comprising:
    computer code that receives a request for a connection to the resource, wherein the request is arranged to specify a plurality of attribute values and the request does not indicate whether the connection to the resource should be obtained from a cache or opened to the resource;
    computer code that determines if available connections are stored in a cache, comprising determining if a first connection in the cache has a first attribute value that matches a second attribute value of the plurality of attribute values and if the first connection in the cache has a third attribute value that matches a fourth attribute value of the plurality of attribute values; and
    computer code that obtains the connection to the resource from the cache if available connections are stored in a cache.

9. The computer-executable program product of claim 8, wherein the computer readable medium comprises at least one of a CD-ROM, floppy disk, tape, flash memory, system memory, or hard drive.

10. A database system, comprising:
    a database that stores information;
    a cache that stores connections to the database; and
    a connection manager that receives a request for a connection to the resource, wherein the request is arranged to specify a plurality of attribute values; the request does not indicate whether the connection to the resource should be obtained from the cache or opened to the resource; determines if available connections are stored in the cache, comprising determining if a first connection in the cache has a first attribute value that matches a second attribute value of the plurality of attribute values and if the first connection in the cache has a third attribute value that matches a fourth attribute value of the plurality of attribute values; and obtains the connection to the resource from the cache if available connections are stored in the cache.

11. A method of caching connections to a resource, comprising:
    receiving a request for a connection to the resource, wherein the request is arranged to specify a plurality of attribute values and the request does not indicate whether the connection to the resource should be obtained from a cache or opened to the resource;
    analyzing a property of the resource to determine if available connections are stored in a cache;
    obtaining the connection to the resource from the cache if available connections are stored in a cache, comprising determining if a first connection in the cache has a first attribute value that matches a second attribute value of the plurality of attribute values and if the first connection in the cache has a third attribute value that matches a fourth attribute value of the plurality of attribute values; and obtaining the connection to the resource by opening the connection if available connections are not stored in a cache.

12. The method of claim 11, further comprising initializing the cache if available connections are stored in a cache and this is a first request for a connection to the resource.

13. The method of claim 11, wherein the resource is a database.

14. A computer-executable program product embodied using a computer-readable medium that caches connections to a resource, comprising:
   computer code that receives a request for a connection to the resource, wherein the request is arranged to specify a plurality of attribute values and the request does not indicate whether the connection to the resource should be obtained from a cache or opened to the resource;
   computer code that analyzes a property of the resource to determine if available connections are stored in a cache;
   computer code that obtains the connection to the resource from the cache if available connections are stored in a cache, comprising determining if a first connection in the cache has a first attribute value that matches a second attribute value of the plurality of attribute values and if the first connection in the cache has a third attribute value that matches a fourth attribute value of the plurality of attribute values; and
   computer code that obtains the connection to the resource by opening the connection if available connections are not stored in a cache.

15. The computer-executable program product of claim 14, wherein the computer readable medium comprises at least one of a CD-ROM, floppy disk, tape, flash memory, system memory, or hard drive.

16. A database system, comprising:
   a database that stores information;
   a cache that stores physical connections to the database; and
   a connection manager that receives a request for a connection to the resource, wherein the request is arranged to specify a plurality of attribute values and that does not indicate whether the connection to the resource should be obtained from the cache or opened to the resource, analyzes a property of the resource to determine if available connections are stored in the cache, obtains the connection to the resource from the cache if available connections are stored in the cache, comprising determining if a first connection in the cache has a first attribute value that matches a second attribute value of the plurality of attribute values and if the first connection in the cache has a third attribute value that matches a fourth attribute value of the plurality of attribute values, and obtains the connection to the resource by opening the connection if available connections are not stored in the cache.

17. A method of caching connections to a resource comprising:
   receiving a request for a connection to the resource, wherein the request is arranged to specify a plurality of attribute values and the request does not indicate whether the connection to the resource should be obtained from a cache or opened to the resource;
   determining if available connections are stored in a cache, comprising determining if a first connection in the cache has a first attribute value that matches a second attribute value of the plurality of attribute values and if the first connection in the cache has a third attribute value that matches a fourth attribute value of the plurality of attribute values;
   if available connections are stored in a cache, obtaining the connection to the resource from the cache; and
   if available connections are not stored in a cache, obtaining the connection to the resource by opening the connection.

18. The method of claim 17 wherein determining if available connections are stored in a cache comprises analyzing a property of the resource.

19. The method of claim 17 further comprising:
   initializing the cache if available connections are stored in a cache and the request is a first request for a connection to the resource.

20. The method of claim 17 wherein the resource is a database.

21. The method of claim 17 wherein the determining if available connections are stored in a cache comprises weighting the attribute values.

22. The method of claim 21 wherein the attribute values include language sets of available connections stored in the cache.

23. The method of claim 17 further comprising:
   utilizing the connection to the resource;
   determining when a timeout associated with the connection to the resource expires, wherein the time out specifies a time limit on how long the connection to the resource may be utilized; and
   returning the connection to the resource to the cache when the timeout expires.

24. A computer-executable program product, embodied using a computer-readable medium that caches connections to a resource, comprising:
   computer code that receives a request for a connection to the resource, wherein the request is arranged to specify a plurality of attribute values and the request does not indicate whether the connection to the resource should be obtained from a cache or opened to the resource;
   computer code that determines if available connections are stored in a cache, comprising determining if a first connection in the cache has a first attribute value that matches a second attribute value of the plurality of attribute values and if the first connection in the cache has a third attribute value that matches a fourth attribute value of the plurality of attribute values;
   computer code that, if available connections are stored in a cache, obtains the connection to the resource from the cache; and
   computer code that, if available connections are not stored in a cache, obtains the connection to the resource by opening the connection.

25. The computer-executable program product of claim 24 wherein the computer readable medium comprises at least one of a CD-ROM, floppy disk, tape, flash memory, system memory, or hard drive.

26. A database system comprising:
   a database that stores information;
   a cache that stores connections to the database; and
   a connection manager that receives a request for a connection to the resource, wherein the request is arranged to specify a plurality of attribute values,
   the request does not indicate whether the connection to the resource should be obtained from the cache or opened to the resource, the connection manager determines if available connections are stored in the cache, comprising determining if a first connection in the cache has a first attribute value that matches a second attribute value of the plurality of attribute values and if the first connection in the cache has a third attribute value that matches a fourth attribute value of the plurality of attribute values, the connection manager obtains the connection to the resource from the cache if available connections are stored in a cache, and the connection manager obtains the connection to the resource by opening the connection if available connections are not stored in a cache.

* * * * *